United States Patent [19]

Kummler et al.

[11] 4,368,169

[45] Jan. 11, 1983

[54] PYROCHEMICAL PROCESSES FOR THE DECOMPOSITION OF WATER

[75] Inventors: Ralph H. Kummler, Birmingham; Charles B. Leffert, Troy; Robert G. Ozarski, Detroit; Robert A. Piccirelli, Grosse Pointe Woods; Theodor Teichmann, Ann Arbor, all of Mich.

[73] Assignee: Texas Gas Transmission Corporation, Owensboro, Ky.

[21] Appl. No.: 568,661

[22] Filed: Apr. 16, 1975

[51] Int. Cl.³ ............................................. G21B 1/00
[52] U.S. Cl. ................................... 376/148; 376/324; 423/415 A; 423/579; 423/655
[58] Field of Search ........................... 176/1, 3, 9, 39; 423/644, 655–657, 415 A, 437, 579, 648 R; 204/157.1 H; 376/148, 323, 324

[56] References Cited

U.S. PATENT DOCUMENTS

| | | | |
|---|---|---|---|
| 3,489,645 | 1/1970 | Daiber et al. | 176/1 |
| 3,490,871 | 1/1970 | Miller et al. | 423/657 |
| 3,802,993 | 4/1974 | Von Fredersdorff | 176/39 |
| 3,821,362 | 6/1974 | Spacil | 423/657 |
| 3,839,550 | 10/1974 | Wentorf, Jr. | 423/644 |
| 3,850,840 | 11/1974 | Aldridge et al. | 423/656 |
| 3,859,373 | 1/1975 | Seitzer | 423/657 |
| 3,880,987 | 4/1975 | Nahas | 423/657 |
| 4,121,984 | 12/1978 | Gomberg et al. | 376/148 |

FOREIGN PATENT DOCUMENTS 908469 10/1962 United Kingdom ................. 176/39

OTHER PUBLICATIONS

"A-Hydrogen-Energy System", prepared for American Gas Association by Institute of Gas Technology, Aug. 1972, by D. P. Gregory, Catalog #L21173, (III-42)–(III-68).
ERDA-28, 1/75, pp. 1-3, 8-10.
"Exploding Reactors for Power", Marwick, 1/27/73, pp. 11,12.
Nuclear News, May 1975, pp. 79, 80.
Wash-1267, Jul. 1973, pp. 5,6,10,12,13,20,21,28,31-34.

*Primary Examiner*—Harvey E. Behrend
*Attorney, Agent, or Firm*—Laurence R. Brown

[57] ABSTRACT

Improved closed-loop pyrochemical processes for the decomposition of water in which at least one of the reaction steps in each process is carried out pyrochemically within the central reaction chamber of a thermonuclear reactor during and immediately after a thermonuclear reaction, and in which one of the reagents in or products of the chamber reaction is a metal having a boiling temperature which is higher than the decomposition temperature of the associated metal oxide. The product of the pyrochemical reaction which includes the metal element is in the condensed phase after completion of the reaction and may thus be easily separated from the remaining gaseous reaction products.

The specific reaction processes disclosed include a two-step process in which the metal is reacted directly with water within the reaction chamber, and a three-step process in which the metal is reacted with carbon dioxide within the central chamber, the reaction products being thereafter used in later process steps for the actual decomposition of water. In either process, the initial chamber reaction yields a condensed metal oxide product which is thereafter split in a later process step, which also takes place within a central fusion reaction chamber, to yield oxygen and a condensed metal product. Tungsten (W) and Tantalum (Ta) are disclosed as exemplary metal reagents.

3 Claims, No Drawings

PYROCHEMICAL PROCESSES FOR THE DECOMPOSITION OF WATER

The present invention relates to water decomposition processes and, more particularly, to closed-loop water decomposition processes which include, in at least one process step, a metal reagent having a boiling temperature which is greater than the decomposition temperature of the oxide associated with that metal.

The usual thermochemical water decomposition processes must operate at relatively low temperatures to avoid dissociation of the product hydrogen and oxygen molecules, and later recombination or "back reaction" of the dissociated products into water during product cooling, thus reducing the efficiency of the overall process. It has generally been found that this dissociation/recombination phenomenon reduces the economic feasibility of conventional water decomposition processes when it is attempted to carry out the same at desirably higher temperatures and/or pressures.

It is an object of the present invention to provide water decomposition processes which operate at high temperature and/or pressure and which, at the same time, yield easily and economically separable products.

More specifically, it is an object of the present invention to provide high temperature water decomposition processes in which one of the reaction products of each high-temperature reaction step is in a phase or state different from that of the remaining reaction products of that step.

In accordance with the present invention at least one reaction step of a selected water decomposition process is carried out within the central reaction chamber of a thermonuclear or fusion reactor. Laser-driven reactor systems including such a central chamber are shown, for example, in the following United States patents:

U.S. Pat. No. 3,378,446, Apr. 16, 1968, Whittlesey
U.S. Pat. No. 3,489,645, Jan. 13, 1970, Daiber
U.S. Pat. No. 3,624,239, Nov. 30, 1971, Fraas
U.S. Pat. No. 3,762,992, Oct. 2, 1973, Hedstrom The subject of laser-driven fusion reactors is also discussed in detail in an article by J. L. Emmett et al, entitled "Fusion Power by Laser Implosion," Scientific American, Vol. 230, No. 6, pgs. 24–37, June 1974.

The conditions which apply in the central reaction chamber of a thermonuclear reactor may be utilized to relieve the more stringent thermodynamic conditions for thermochemical decomposition processes, in much the same way as they act in the direct thermal dissociation of water, with the added advantage that the practical separation and extraction requirements can be more easily met. Such ultra high temperature cycles will henceforth be referred to as "pyrochemical" to distinguish them from the usual thermochemical cycles which, for purposes of the following specification and claims, is limited to $T \leq 1000°$ C.

In the central reaction chamber, the temperature in the energy shock front surrounding the burning pellet is limited only by the properties and amounts of reagents introduced into the reaction chamber. This unique condition provides an automatic drive for the reaction kinetics. If a fraction x of the energy released is to be converted into bound internal energy (i.e., "chemical" binding energy) of the products (assuming reasonable local thermodynamic equilibrium reaction rates) and the balance $(1-x)$ into sensible heat of the products at a temperature $T_p$, then, to a first approximation, the shock temperature $T_s$ will be driven up to the temperature necessary to initiate and drive the reaction to x conversion, and then down to the temperature $T_p$. This presupposes that x is appreciable and that $$(d \ln K_p / d \ln T_p) \geq 0$$

wherein ln designates the natural log function, $T_p$ is the temperature of the product gases, and $K_p$ is the usual chemical equilibrium constant for the product.

These conditions have essentially no analog in the thermochemical processing industry. Reaction materials within the reaction chamber are heated volumetrically in what amounts to a microscopic equivalent of the usual thermochemical process. The processes herein described utilizes these conditions and methods to accomplish the more effective processing detailed.

Water splitting processes in which at least one reaction step is carried out within a central fusion reaction chamber are also the subject of the copending U.S. application of Kummler et al, Ser. No. 548,231, filed Feb. 10, 1975 now by continuation-in-part Ser. No. 725,339 filed Sept. 21, 1976.

In accordance with the present invention, at least one reaction step in a selected water decomposition process includes, as a reagent element, a metal having a boiling temperature which is greater than the decomposition temperature of the oxide associated with that metal, and is carried out within the central reaction chamber of a thermonuclear or fusion reactor. In a closed-loop water decomposition process practiced in accordance with the present invention, a metal oxide formed within the reactor as a product of the one reaction step is dissociated in a subsequent reaction step which is also carried out within a central fusion reaction chamber. In each of these pyrochemical process steps, the reaction product which includes the metal element is in the condensed phase upon completion of the chamber reaction and may be easily separated from the remaining gaseous products.

One closed-loop water decomposition process which may be carried out in accordance with the present invention may be outlined in equation form as follows:

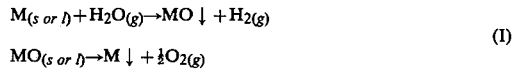

$$M_{(s\ or\ l)} + H_2O_{(g)} \rightarrow MO \downarrow + H_2{(g)}$$
$$MO_{(s\ or\ l)} \rightarrow M \downarrow + \tfrac{1}{2}O_{2(g)}$$

(I)

wherein M is a metal and MO is its associated oxide, and wherein $\downarrow$ indicates a condensed precipitate or product. The valence of M and, therefore, the stoichiometry of process (I) may vary for selected metals and specific applications. The elemental characteristics of M must be such that the oxide MO is more stable thermochemically than the oxide with which it is reacted, in this case water. The characteristics of MO (or, more generally, $M_xO_y$, where x and y depend upon the valence of M) must, further, be such that it decomposes at a temperature which is lower than the boiling temperature of the metal M so that the product metal will condense when the metal oxide is split.

The reaction of the metal with water in the first step of process (I) is highly endothermic and, in accordance with the present invention, may be carried out pyrochemically within the central reaction chamber of a fusion reactor during and immediately after a fusion reaction. The metal and water are first injected into the central reaction chamber. A thermonuclear fuel pellet of deuterium-tritium, for example, is then injected into the chamber and ignited by a high intensity laser beam so that thermonuclear fusion takes place in the conventional manner. Ignition and burn of the fuel pellet releases a quantity of radiant thermal energy which raises the chamber temperature to a level of about 3400° K. During this process, water decomposition proceeds pyrochemically at a very fast rate. The metal combines with the oxygen freed by the water decomposition and forms a condensed precipitate as the reaction products cool. The free hydrogen gas may then be easily separated from the condensed oxide product.

The metal oxide is then, in accordance with the invention, pyrochemically dissociated in reaction step two in a second fusion chamber reaction which proceeds substantially as described above. Because of the above-described elemental metal characteristics, the free metal product of the oxide dissociation step condenses leaving a free oxygen gas product. In most cases, the free oxygen will be largely dissociated, i.e., in elemental rather than molecular form, at the elevated chamber temperature. However, recombination or back reaction with the metal is substantially avoided during product cooling since the metal is in the condensed phase. The condensed metal product of reaction step two may, of course, be recycled for use in a subsequent reaction step one to form a closed-loop water splitting process.

As specific examples of process (I), the following may be considered:

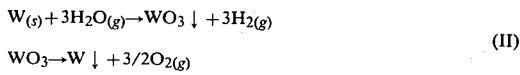
(II)

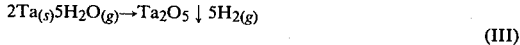
(III)

The boiling point of tungsten is about 5900° K. while the dissociation temperature of its oxide $WO_3$ is about 5300° K. Similarly, the boiling point of tantalum is about 5700° K. while the dissociation temperature of its oxide is about 5500° K.

A second closed-loop water decomposition process exemplary of the present invention may be outlined in equation form as follows:

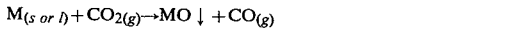

$CO + H_2O \rightarrow CO_2 + H_2$ (IV)

The second reaction step of process (IV) is the conventional water/gas shift reaction and may be carried out according to the usual thermochemical methods. The first and third reaction steps of process (IV) are, according to the present invention, carried out pyrochemically in a central fusion reaction chamber during and immediately after a fusion reaction. The respective product gases $CO_2$ and $O_2$ may be easily separated from the condensed metal or metal oxide products. Again, the carbon dioxide product from process step two and the elemental metal product from process step three may be recycled for use in a subsequent process step one to form a closed-loop process for the decomposition of water.

Specific examples of process (IV) are:

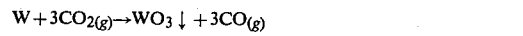
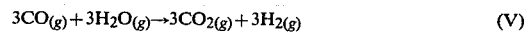
(V)

and

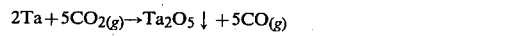
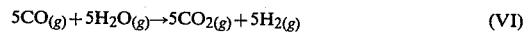
(VI)
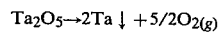

From the foregoing description, it will now be apparent that there has been provided, in accordance with the present invention, improved closed-loop processes for the decomposition of water which fully satisfy all of the objects, aims and advantages set forth above. Furthermore, it will be evident that, while the invention has been disclosed with reference to several specific example processes using either tungsten or tantalum, other metals and/or reaction processes may be used, provided that the reagent metal M has a boiling point higher than its oxide $M_xO_y$, and that the oxide $M_xO_y$ is thermochemically more stable than the oxide with which the elemental metal M is reacted. Furthermore, many other alternatives, modifications and variations will also suggest themselves to persons skilled in the art in view of the foregoing description. Accordingly, the invention is intended to embrace all such alternatives, modifications and variations as fall within the spirit and broad scope of the appended claims.

The invention claimed is:

1. A process for decomposition of a stable compound comprising:
   a. injecting carbon dioxide and a metal M having an associated metal oxide $M_xO_y$ into the central reaction chamber of a nuclear fusion reactor, said metal oxide having a decompositing temperature which is less than the boiling temperature of said metal and being chemically more stable than is said carbon oxide,
   b. causing a D-T nuclear fusion reaction within said chamber releasing heat and radiation such that said metal oxide and carbon monoxide are formed pyrochemically, and
   c. separating said carbon monoxide from said metal oxide,
   d. injecting said metal oxide obtained in step (c) into said central reaction chamber and causing a D-T nuclear fusion reaction within said chamber releasing heat and radiation such that said metal and oxygen are formed from said metal oxide, and
   e. Separating said oxygen from said metal to obtain the starting metal.

2. The process set forth in claim 1 further comprising the step of:
   f. thermochemically reacting said carbon monoxide with water outside said chamber such that carbon dioxide and hydrogen are formed.

3. The process set forth in claim 1 wherein said metal is selected from the group consisting of tungsten and tantalum.

* * * * *